Figure 1:
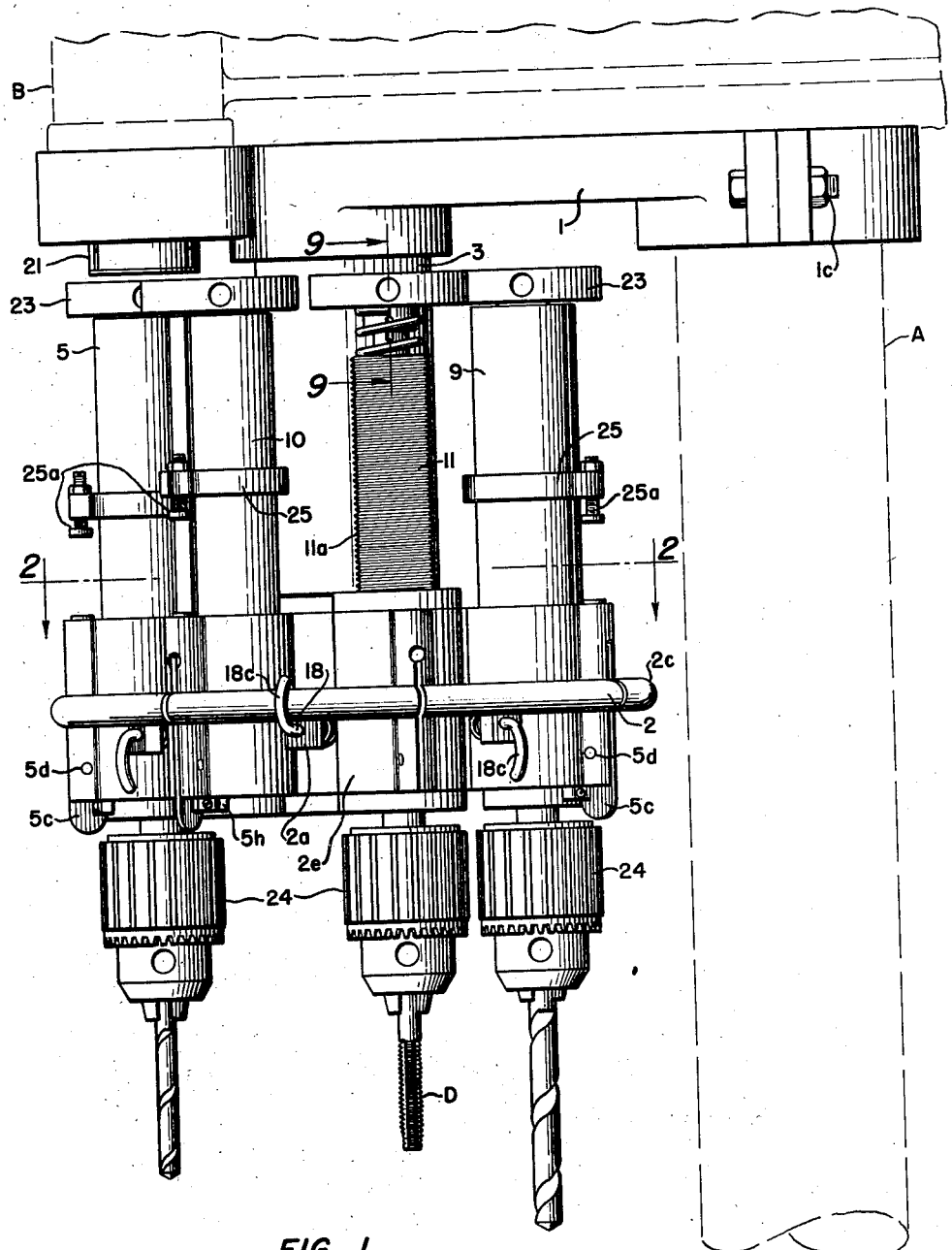

March 25, 1952  J. L. WEAVER  2,590,283
MULTIPLE SPINDLE DRILL APPARATUS
Filed May 28, 1945  3 Sheets-Sheet 2
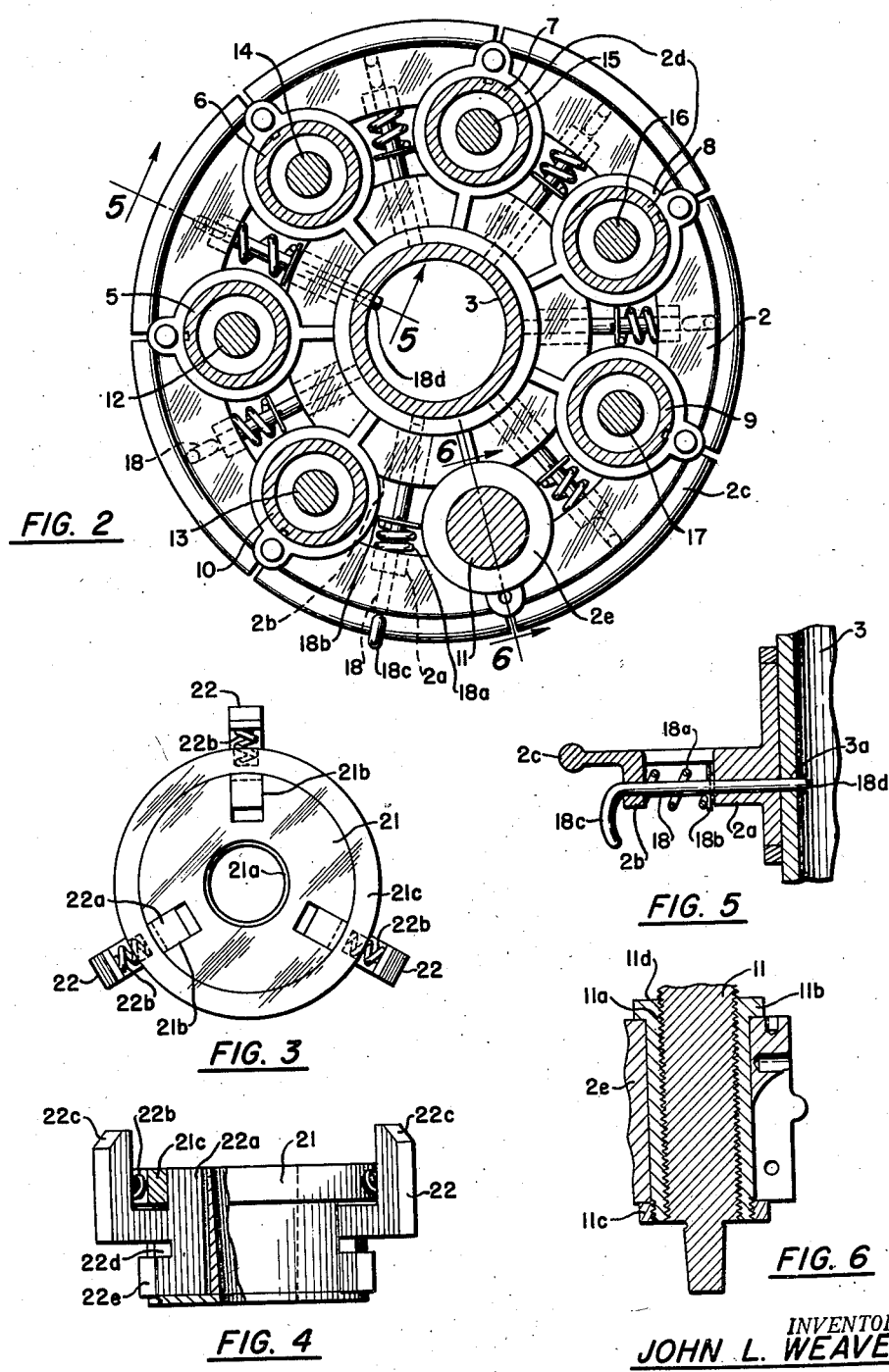
INVENTOR.
JOHN L. WEAVER
BY
A. B. Bowman
ATTORNEY March 25, 1952 J. L. WEAVER 2,590,283
MULTIPLE SPINDLE DRILL APPARATUS
Filed May 28, 1945 3 Sheets-Sheet 3
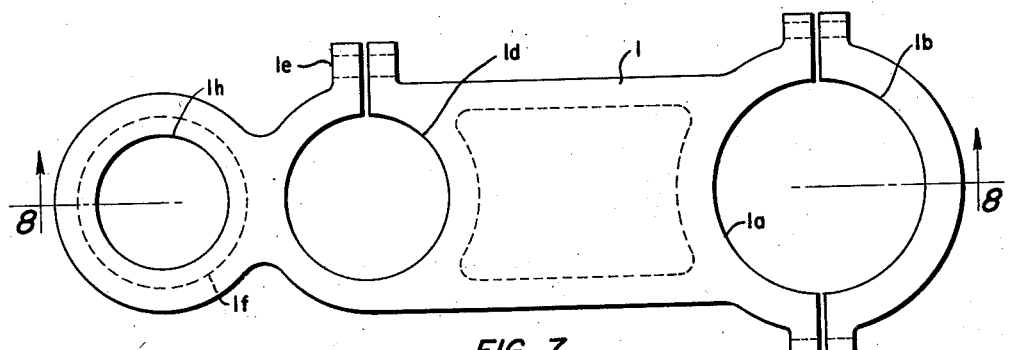
FIG. 7
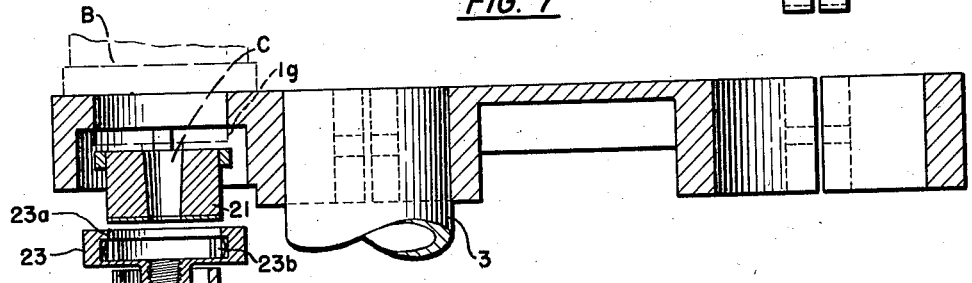
FIG. 8
FIG. 9
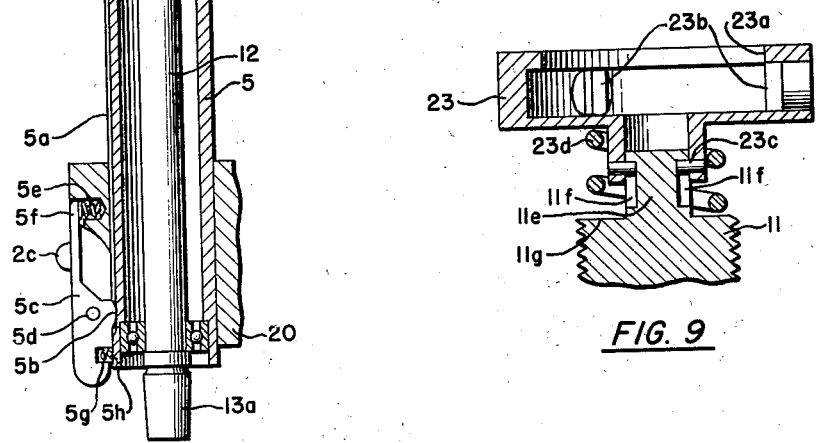
FIG. 10
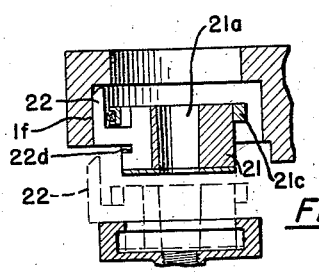
INVENTOR.
JOHN L. WEAVER
BY
A. B. Bowman
ATTORNEY Patented Mar. 25, 1952

2,590,283

UNITED STATES PATENT OFFICE 2,590,283

MULTIPLE SPINDLE DRILL APPARATUS

John L. Weaver, Encinitas, Calif.

Application May 28, 1945, Serial No. 596,167

9 Claims. (Cl. 29—26)

My invention relates to a multiple spindle drill apparatus, more particularly for use in connection with conventional drill presses, and the objects of my invention are:

First, to provide an apparatus of this class having a multiplicity of spindles arranged to operate a variety of tools for performing a variety of operations on parts using a single conventional drill press;

Second, to provide an apparatus of this class having a novel clutch means in connection with the conventional drill press spindle engageable with a variety of tool supporting spindles which is operated by the conventional drill press operating handle in the conventional manner;

Third, to provide an apparatus of this class which may be readily attached to a conventional drill press for precision multi-machine operations on various parts;

Fourth, to provide an apparatus of this class in which the vertical travel of the tool supporting spindles is controlled entirely by the conventional operating handle of the conventional drill press.

Fifth, to provide an apparatus of this class in which the tool supporting spindles are latched in an upward position when not in use and are automatically unlatched when the operating handle of the drill press forces the conventional drill press spindle downwardly and are automatically returned to and latched in said upward position when said operating handle is operated in the opposite direction;

Sixth, to provide an apparatus of this class in which the tool spindle engaging clutch engages the tool spindle automatically on the downstroke and forces the tool supporting spindle into the upward position when returning and automatically disengages from the tool supporting spindle when in the uppermost position;

Seventh, to provide an apparatus of this class in which a multiplicity of spindles each positively register in direct alignment with the conventional drill press spindle for precision machine operations;

Eighth, to provide an apparatus of this class having a multiplicity of spindles, one of which operates as a machine tapping spindle having automatic feed after the clutch in connection with the conventional drill press spindle is engaged with the tool holding spindle by the operation of the conventional operating handle; and Ninth, to provide an apparatus of this class which is very simple and economical of construction in accordance with its utility, which is very efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my multispindle drill apparatus showing by broken lines the connected relationship of a conventional drill press; Fig. 2 is a horizontal plan sectional view taken from the line 2—2 of Fig. 1; Fig. 3 is a plan view of the tool spindle engaging chuck; Fig. 4 is a side elevational view thereof showing portions broken away and in section to amplify the illustration; Fig. 5 is a fragmentary sectional view taken from the line 5—5 of Fig. 2 and Fig. 6 is a fragmentary sectional view showing the tapping spindle nuts together with the tapping spindle screw-threaded therein; Fig. 7 is a plan view of the connecting frame member used to connect my motor spindle drill apparatus with a conventional drill press; Fig. 8 is a fragmentary sectional view thereof showing the longitudinal section of one of the spindles of my multispindle drill apparatus in connection therewith; Fig. 9 is a fragmentary sectional view shown on an enlarged scale taken on the line 9—9 of Fig. 1 and Fig. 10 is a fragmentary sectional view of the connecting frame members showing the jaws of the tool spindle engaging chuck in engagement therewith and showing by dash lines the disengagement of said chuck with said connecting frame members and in connected relation with the spindle clutch member.

Similar characters of reference refer to similar parts and portions throughout the several views of the drawings:

The connecting frame member 1, spindle supporting frame 2, spindle frame shaft 3, spindle housings 5, 6, 7, 8, 9 and 10, tool supporting spindle shafts 11, 12, 13, 14, 15, 16 and 17, latch members 18, spindle bearings 19 and 20, male clutch members 21, clutch jaws 22, spindle clutch members 23, chucks 24 and the stop members 25 constitute the principal parts and portions of my multiple spindle drill apparatus.

The connecting frame member 1, as shown best in Fig. 7 of the drawings, is provided with a capped clamping boss portion 1a having a cap 1b engageable with the post A of a conventional drill press and secured in connection therewith by bolts 1c, as shown best in Fig. 1 of the drawings. This frame member 1 is preferably a casting and may be varied in proportions, as desired, to fit conventional drill presses. This connecting frame member 1 is also provided with a clamping boss 1d arranged to be clamped by a bolt inserted in screw-threaded relation in the lug 1e thereof, as shown in Fig. 7 of the drawings. Positioned in this clamping boss portion 1d is the spindle frame shaft 3, as shown best in Fig. 8 of the drawings, which supports the spindle supporting frame 2 in connection with the connecting frame member 1, as shown best in Figs. 1 and 2 of the drawings.

The connecting frame member 1 is also provided with a clutch engaging housing portion 1f which aligns with the axis of the conventional drill press in close proximity to the spindle head B thereof, as shown best in Figs. 1 and 8 of the drawings. Extending downwardly from the conventional spindle head B is the spindle bearing housing 1g which is clamped in the bore 1h of the connecting frame 1.

The spindle frame shaft 3 forms a journal about which the spindle supporting frame 2 is revolubly mounted and also forms a registering means for aligning the spindle shafts 11, 12, 13, 14, 15, 16 and 17 with the axis of the conventional drill press spindle head B, as shown best in Figs. 1 and 2 of the drawings. This spindle frame shaft 3 is provided with radially disposed openings in the side wall thereof arranged to receive the inwardly extending ends 18d of the latch members 18 which are reciprocably mounted in the spindle supporting frame 2. These latch members 18 are provided with compression springs 18a bearing against washers 18b pinned onto the latch members 18, as shown best in Fig. 2 of the drawings. These latch members 18 are slidably indexed in the bosses 2a and 2b integral with the spindle supporting frame 2, all as shown best in Figs. 1 and 2 of the drawings. It will be noted that the latch members 18 are each provided with hook portions 18c, as shown in Fig. 1 of the drawings, which may be rotatably shifted and engaged with the peripheral ring portion 2c of the spindle supporting frame 2 holding the inner ends of the latch members 18 out of engagement with the spindle frame shaft 3 so that the spindle supporting frame 2 may be rotated about said spindle shaft 3 for indexing other of the spindle shafts 11 to 17 inclusive, all as desired. As shown in Fig. 2 of the drawings, the spindle supporting frame 2 is provided with a plurality of spindle housing guide bearings 2d in which the spindle housings 5 to 10 inclusive are vertically reciprocably mounted, it being noted, however, that the bearing boss 2e is arranged to engage a threaded tapping spindle, shown best in Figs. 1 and 2 of the drawings. This tapping spindle shaft 11, as shown in Figs. 1 and 6 of the drawings, is provided with screw threads 11a engageable with a bushing 11b having internal screw threads in engagement with the screw threads 11a of the spindle shaft 11. This bushing 11b is positioned in the bearing boss 2e and is secured in connection therewith by the nut 11c screw-threaded on the opposite end of the bushing 11b from the shoulder portion 11d thereof.

Each of the spindle shafts 12 to 17 inclusive is mounted at opposite ends in spindle bearings 19 and 20 on the inner side of the spindle housings 5 to 10 inclusive. These spindle bearings 19 and 20 are capable of taking a thrust load as well as a radial load; thus the spindle shafts 12 to 17 inclusive are maintained in longitudinal fixed relation in the spindle housings 5 to 10 inclusive.

Secured on the upper end of each of the spindle shafts 12 to 17 inclusive, is a spindle clutch member 23. This spindle clutch member 23 is provided with a concentric recess portion having an inwardly extending annular shoulder 23a at the upper edge thereof. Below this inwardly extending annular ledge 23a is a plurality of inwardly extending lugs 23b. The spindle housings 5 to 10 inclusive, are each provided with a longitudinally slotted portion 5a engaged by inwardly extending portions 5b of one of the spindle housing latch members 5c. These latch members 5c are each mounted on a pin 5d, as shown best in Fig. 8 of the drawings. The inwardly extending portion 5b extending in the slotted portion 5a of each of the spindle housings 5 to 10 inclusive maintain the same against rotative movement in the bearing bosses 2d of the spindle supporting frame 2. These spindle housing latches 5c extend upwardly from the pins 5d and are engaged by a spring 5e at their upper ends 5f, which springs 5e tend to force the notched latched portion 5g toward the spindle housing 5 to 10 inclusive maintaining the notched portion 5g over the latchblock 5h secured in connection with each of the spindle housings 5 to 10 inclusive. It will be noted, however, that vertical pressure downwardly of the spindle housings 5 to 10 inclusive pivots these latch members 5c on the pins 5d disengaging the notch latch portion 5g from the latchblocks 5h permitting the spindle housing together with its respective spindle shaft to move downwardly. The latch portion 5g is readily pivoted outwardly at its lower end, due to the lateral position of the axis of the pin 5d outwardly of the engaging portion of said latch portion 5g. Therefore these latch members 5c are provided to support the spindle housings 5 to 10 inclusive in the position as shown in Fig. 8 of the drawing until engaged for operation.

The stop members 25 are ring shaped clamp members secured around the spindle housings 5 to 10 inclusive and are each provided with vertically adjustable stop screws 25a engageable with the upper side of the spindle supporting frame 2 when the spindle housings 5 to 10 inclusive are forced downwardly.

The male clutch member 21 is cylindrical in form and provided with a tapered bore 21a centrally located therein engageable with the spindle C of the conventional drill press spindle head B, as shown best in Fig. 8 of the drawings. This male clutch member 21 is also provided with radially disposed slotted portions 21b in which are positioned the clutch jaws 22. These clutch jaws 22 are retained in connection with the male clutch member 21 by the ring 21c which is pressed on the male clutch member 21 around the upper ends of the clutch jaws 22 at their inwardly extending portions 22a, as shown best in Fig. 4 of the drawings. These portions 22a are held outwardly in engagement with the ring 21c by the springs 22b, as shown best in Figs. 3 and 4 of the drawings. Each of the clutch jaws 22 is provided with an inclined portion 22c at its upper end. The lower end of each of the male clutch members 22 is provided with a notch portion 22d arranged to fit over the inwardly and annularly extending ledge 23a of the spindle clutch member 23. As shown in Fig. 10 of the drawings, the clutch jaws 22 when in the position as shown in Fig. 8 of the drawings engage the inner side wall of the clutch disengaging boss 1f of the connecting frame member 1. When the clutch jaws 22 are so engaged, the springs 22b are compressed and the notch portions 22d of the clutch jaws 22 are forced inwardly, as shown by solid lines in Fig. 10 of the drawings. As shown by dash lines in Fig. 10 of the drawings, the clutch jaws 22 when in the lower position are pressed out by the springs 22b whereupon the notch portions 22d fit over the inwardly and annularly extending ledge 23a of the spindle clutch member 23 and the lower end portions 22e of the clutch jaws 22 engage the inwardly extending lugs 23b of the spindle clutch members 23 providing a rigidly engaged relation of the clutch jaws 22 with the spindle clutch members 23.

The spindle clutch member 23 is connection with the spindle shaft 11 is reciprocably mounted on the upper stub end 11e of the spindle 11 by means of pins 23c engaging vertically slotted portions 11f at opposite sides of said stub end 11e. A spring 23d is interposed between the spindle clutch 23 and the shoulder 11g of the spindle 11 tending to hold the pins 23c in the upper end of the slotted portion 11f, all as shown best in Fig. 9 of the drawings.

As shown in Fig. 8 of the drawings, each of the spindle shafts 11 to 17 inclusive is provided with tapered portions 13a engageable with substantially conventional chucks 24 shown in Fig. 1 of the drawings for holding various tools.

It will be here noted that the radial dispositions of the bearing boss portions 2d of the spindle supporting frame 2 are all arranged to align with the axis of the conventional drill press spindle head B when rotatably shifted about the axis of the spindle frame shaft 3 so that the spindle clutch members 23 may each be concentrically engaged by the male clutch member 21 together with the clutch jaws 22.

The operation of my multiple spindle drill apparatus is substantially as follows: When it is desired to drill or perform other machine operations on a work piece, the conventional drill press handle is operated causing the male clutch member 21 to pass downwardly into the spindle clutch member 23 registered concentrically therewith. In passing downwardly the male clutch member 21 carries the clutch jaws 22 which become disengaged from the clutch disengaging boss 1f permitting the springs 22b to force the clutch jaws 22 outwardly engaging the inwardly extending annular ledge 23a in the notch portion 22d of the clutch jaws 22 whereupon the lower portions 22e of the clutch jaws 22 engage the inwardly extending lug portion 23b of the spindle clutch member 23. The rotation of the spindle C of the conventional drill press then causes the spindle shaft 12, as shown in Fig. 8 of the drawings, to revolve carrying with it the chuck 24 in connection therewith, as shown in Fig. 1 of the drawings, revolving the tool to be used. As the conventional drill press handle is operated the male clutch 21 together with the spindle housing 5 and the spindle shaft 12 is forced downwardly. During the initial down travel of the spindle housing 5, the latch 5d is pivotally disengaged from the latch block 5h pressing the spring 5e behind the end 5f of the latch 5c. Further down travel of the spindle casing 5 together with the spindle shaft 12 may be had to complete the machining operation on the work piece.

When the operating handle of the drill press is operated in the opposite direction, the spindle shaft 12, together with the spindle casing 5, as shown in Fig. 8 of the drawings, are retracted to the latch position, as shown by solid line in Figs. 8 and 10 of the drawings, whereupon the clutch jaws 22 engage the inner wall of the clutch disengaging boss 1f at their angular portions 22e compressing the springs 22b and releasing the lower portions 22e of the clutch jaw 22 from the lugs 23b in the spindle clutch members 23. Also the notch portions 22d are released from the inwardly extending annular ledge portions 23a of the spindle clutch members 23. It will be noted, however, that the notch portions 22d in the clutch jaws 22 retain the inwardly extending annular ledge portion 23a of the spindle clutch member 23 until the spindle housing latchblock 5h is engaged in the notch portion 5g of the latches 5c, all as shown best in Fig. 8 of the drawings.

When a different tool is to be used, the operator pulls the latch 18 which is indexed in engagement with the opening 3a in the side wall of the spindle frame shaft 3 permitting rotation of the spindle supporting frame 2 about the spindle frame shaft 3 whereupon the next tool to be used is indexed by one of the latch members 18 at its end portion 18d in the hole 3a of the spindle frame shaft 3, as shown best in Fig. 5 of the drawings. If it is desired to eliminate one of the series of tools in a series of machine operations, the latch 18 is turned so that its hook portion 18c is engaged with the periphery 2c of the spindle supporting frame 2. Thus the particular latch 18 for indexing the undesired tool is out of engagement with the spindle frame shaft 3 and does not fall into place as the spindle supporting frame is rotated for performing consecutive machine operations with a variety of tools. The spindle shaft 11 is particularly adapted for use in tapping holes providing screw threads therein and this spindle shaft 11 is provided with external threads having a helical lead corresponding to the helical lead of the taps used in the chuck 24 in connection therewith. When the clutch 23 in connection with the spindle shaft 11 is engaged by the clutch member 21, the vertical travel of the spindle shaft 11 is initiated by means of the screw threads thereon in engagement with the bushing 11b. Thus the tap D, as shown in Fig. 1 of the drawings, is rotated and fed according to the helical pitch thereof.

When the spindle shaft 11 is rotated in the opposite direction for retraction, the spindle clutch member 23 in connection therewith is held in upward position by means of the spring 23d until the male clutch member 21, together with the clutch jaws 22e are disengaged. Upward vertical travel of the spindle shaft 11 due to rotating inertia thereof compresses the spring 23d slightly until the rotation of said spindle shaft 11 stops. Thus the screw threads on the spindle shaft 11 are maintained free in the bushing 11b with a slight amount of compression thereagainst due to the compression of the spring 23d caused by the engagement of the spindle clutch member 23 with the bottom of the male clutch member 21 after the rotation of the spindle shaft 11 has stopped.

Though I have shown and described a particular construction, combination and arrangement of parts and portions, I do not wish to be limited to the particular construction, combination and arrangement but desire to include in the scope of my invention the construction, combination and arrangement substantially as set forth in the appended claims.

Having thus described my invention, what I claim as new and desire to secure by Letters Patent is:

1. In a multiple spindle drilling apparatus of the class described, the combination of a drill press having a vertical head supporting post and a spindle, a connecting frame member secured to said vertical head supporting post, and having a spindle frame shaft extending vertically therefrom at one side of the spindle axis of said drill press, said connecting frame member provided with a bore surrounding the spindle bearing housing of said drill press, and a spindle supporting frame secured on said spindle frame shaft having a plurality of radially disposed spindle bearing bosses, a plurality of shiftable spindle shafts reciprocally mounted in said bearing bosses having clutch means on the upper ends thereof, and clutch means on the spindle of said drill press individually engageable with each of said clutch means on each of said spindle shafts.

2. In a multiple spindle drilling apparatus of the class described, the combination of a drill press having a vertical head supporting post and a spindle, a connecting frame member secured to said vertical head supporting post, and having a spindle frame shaft extending vertically therefrom at one side of the spindle axis of said drill press, said connecting frame member provided with a bore surrounding the spindle bearing housing of said drill press, and a spindle supporting frame secured on said spindle frame shaft having a plurality of radially disposed spindle bearing bosses, a plurality of shiftable spindle shafts reciprocally mounted in said bearing bosses having clutch means on the upper ends thereof, and clutch means on the spindle of said drill press individually engageable with each of said clutch means on each of said spindle shafts, said clutch means on said drill press having radially disposed spring-loaded clutch jaws engageable externally with said connecting frame member around said jaws, whereby the vertical travel of said spindle of said drill press causes said spring-loaded jaws to shift outwardly into engagement with said clutch means on said spindle shaft in said spindle supporting frame.

3. In a multiple spindle drilling apparatus of the class described, the combination of a drill press having a vertical head supporting post and a spindle, a connecting frame member secured to said vertical head supporting post and having a spindle frame shaft extending vertically therefrom at one side of the spindle axis of said drill press, said connecting frame member provided with a bore surrounding the spindle bearing housing of said drill press, and a spindle supporting frame secured on said spindle frame shaft having a plurality of radially disposed spindle bearing bosses, a plurality of shiftable spindle shafts reciprocally mounted in said bearing bosses having clutch means on the upper ends thereof, and clutch means on the spindle of said drill press individually engageable with each of said clutch means on each of said spindle shafts, said clutch means on said drill press having radially disposed spring-loaded clutch jaws engageable externally with said connecting frame member around said jaws, whereby the vertical travel of said spindle of said drill press causes said spring-loaded jaws to shift outwardly into engagement with said clutch means on said spindle shaft in said spindle supporting frame, and indexing latch means on said spindle supporting frame engageable with said spindle frame shaft for indexing said spindle shaft in said spindle supporting frame in alignment with the spindle shaft of said conventional drill press.

4. In a multiple spindle drill apparatus of the class described, the combination of a drill press having a vertical head supporting post and a spindle, a connecting frame member secured on said vertical head supporting post of said conventional drill press, a spindle frame shaft on said connecting frame member extending downwardly therefrom, said connecting frame provided with a bore portion surrounding and engaging the spindle bearing of said drill press, a spindle supporting frame having radially disposed bearing bosses rotatable about said spindle frame shaft whereby the said bearing bosses of said spindle supporting frame are in radial alignment with the axis of the spindle of said drill press, spindle housings vertically reciprocably mounted in said bearing bosses of said spindle supporting frame, bearings in said spindle housings, spindle shafts rotatably supported in said bearings, and means engageable with said spindle housings for supporting the same in connection with said spindle supporting frame.

5. In a multiple spindle drill apparatus of the class described, the combination of a drill press having a vertical head supporting post and a spindle, a connecting frame member secured on said vertical head supporting post of said conventional drill press, a spindle frame shaft on said connecting frame member extending downwardly therefrom, said connecting frame provided with a bore portion surrounding and engaging the spindle bearing of said drill press, a spindle supporting frame having radially disposed bearing bosses rotatable about said spindle frame shaft whereby the said bearing bosses of said spindle supporting frame are in radial alignment with the axis of the spindle of said drill press, spindle housings vertically reciprocably mounted in said bearing bosses of said spindle supporting frame, bearings in said spindle housings, spindle shafts rotatably supported in said bearings, and latch means engageable with said spindle housings for supporting the same in connection with said spindle supporting frame, each of said spindle housings having a longitudinal slotted portion in the outer side wall thereof engageable by an inwardly extending portion of said latch for holding said spindle housing against rotative movement.

6. In a multiple spindle drill apparatus of the class described, the combination of a drill press having a vertical head supporting post and a spindle, a connecting frame member secured on said vertical head supporting post of said conventional drill press, a spindle frame shaft on said connecting frame member extending downwardly therefrom, said connecting frame provided with a bore portion surrounding and engaging the spindle bearing of said drill press, a spindle supporting frame having radially disposed bearing bosses rotatable about said spindle frame shaft whereby the said bearing bosses of said spindle supporting frame are in radial alignment with the axis of the spindle of said drill press, spindle housings vertically reciprocably mounted in said bearing bosses of said spindle supporting frame, bearings in said spindle housings, spindle shafts rotatably supported in said bearings, latch means engageable with said spindle housings for supporting the same in connection with said spindle supporting frame, each of said spindle housings having a longitudinal slotted portion in the outer side wall thereof engaged by an inwardly extending portion of said latch for holding said spindle housing against rotative movement, and indexing latch means radially disposed relatively to said spindle frame shaft and engageable therewith for indexing the axis of said spindle shaft in alignment with the spindle shaft of said drill press.

7. In a multiple spindle drill apparatus of the class described, the combination of a drill press having a vertical head supporting post and a spindle, a connecting frame member connected to said vertical head supporting post of said conventional drill press, a spindle frame shaft extending downwardly from said connecting frame member, said connecting frame provided with a bore portion surrounding and engaging the spindle bearing of said drill press, a spindle supporting frame on said spindle frame shaft below said connecting frame member provided with a plurality of bearing bosses radially disposed from the axis of said spindle frame shaft and rotatable therearound, an internally screw-threaded bushing in one of said bearing bosses and an externally screw-threaded spindle shaft in engagement with the internal screw threads of said bushing, a tool chuck on the lower end of said spindle shaft and a screw thread cutting tap in said chuck.

8. In a multiple spindle drill apparatus of the class described, the combination of a drill press having a vertical head supporting post and a spindle, a connecting frame member connected to said vertical head supporting post of said conventional drill press, a spindle frame shaft extending downwardly from said connecting frame member, said connecting frame provided with a bore portion surrounding and engaging the spindle bearing of said drill press, a spindle supporting frame on said spindle frame shaft below said connecting frame member provided with a plurality of bearing bosses radially disposed from the axis of said spindle frame shaft and rotatable therearound, an internally screw-threaded bushing in one of said bearing bosses and an externally screw-threaded spindle shaft in engagement with the internal screw threads of said bushing, a tool chuck on the lower end of said spindle shaft, a screw thread cutting tap in said chuck, and external threads on said spindle shaft having the same helical lead as said tap.

9. In a multiple spindle drill apparatus of the class described, the combination of a drill press having a vertical head supporting post and a spindle, a connecting frame member connected to said vertical head supporting post of said conventional drill press, a spindle frame shaft extending downwardly from said connecting frame member, said connecting frame provided with a bore portion surrounding and engaging the spindle bearing of said drill press, a spindle supporting frame on said spindle frame shaft below said connecting frame member provided with a plurality of bearing bosses radially disposed from the axis of said spindle frame shaft and rotatable therearound, an internally screw-threaded bushing in one of said bearing bosses and an externally screw-threaded spindle shaft in engagement with the internal screw threads of said bushing, a tool chuck on the lower end of said spindle shaft, a screw thread cutting tap in said chuck, external threads on said spindle shaft having the same helical lead as said tap, said spindle shaft arranged to be aligned with the spindle of said drill press and clutch means in connection with said spindle shaft for turning the same in connection with the spindle of said drill press.

JOHN L. WEAVER.

REFERENCES CITED

The following references are of record in the file of this patent:

UNITED STATES PATENTS

| Number | Name | Date |
|---|---|---|
| 734,572 | Koester | July 28, 1903 |
| 1,104,517 | Landau | July 21, 1914 |
| 1,461,755 | Cox | July 17, 1923 |
| 1,681,288 | Galloway | Aug. 21, 1928 |
| 1,760,843 | Hasty | May 27, 1930 |
| 2,227,582 | Hillman et al. | Jan. 7, 1941 |

FOREIGN PATENTS

| Number | Country | Date |
|---|---|---|
| 465,065 | Great Britain | Apr. 30, 1937 |